(No Model.)
A. K. SCHAAF.
COMBINED DRAG AND HARROW.
No. 535,732. Patented Mar. 12, 1895.
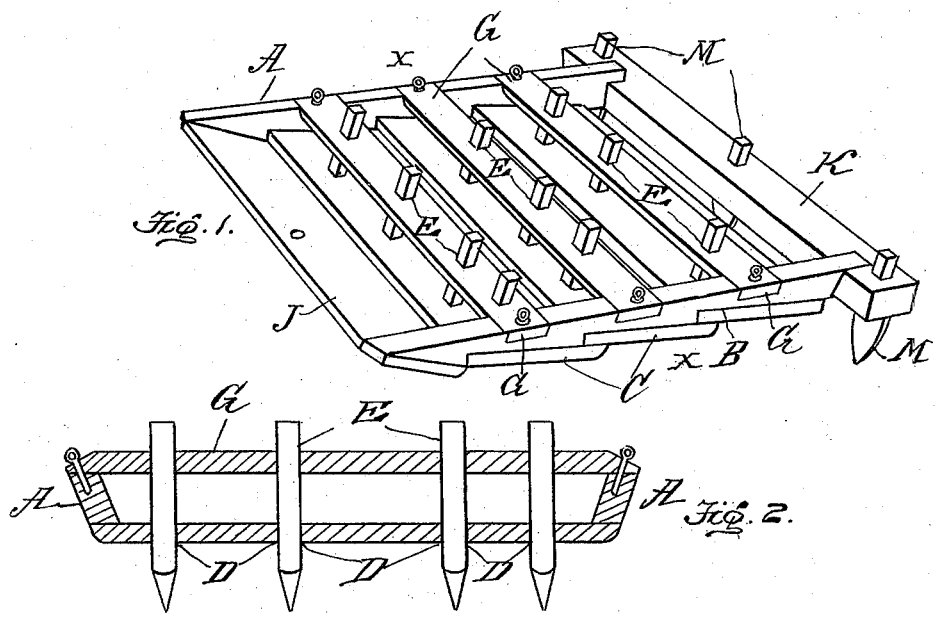
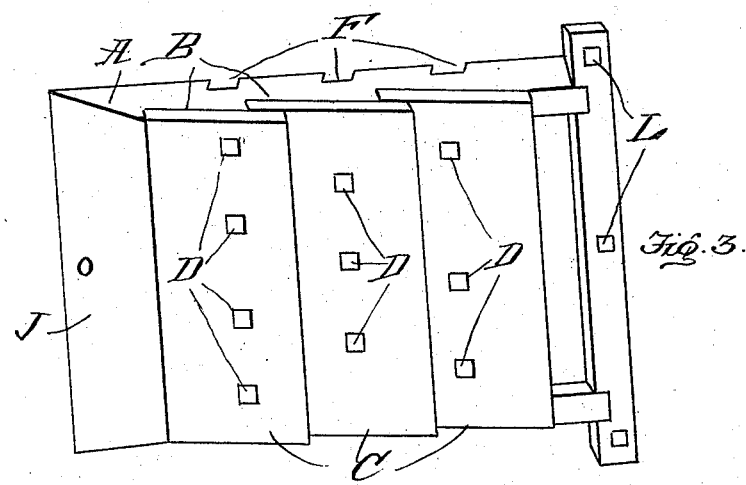
WITNESSES
INVENTOR
Adolph K. Schaaf
By W. K. Miller
Attorney

United States Patent Office.

ADOLPH K. SCHAAF, OF SMITHVILLE, OHIO.

COMBINED DRAG AND HARROW.

SPECIFICATION forming part of Letters Patent No. 535,732, dated March 12, 1895.

Application filed October 29, 1894. Serial No. 527,237. (No model.)

*To all whom it may concern:*

Be it known that I, ADOLPH K. SCHAAF, a citizen of the United States, and a resident of Smithville, county of Wayne, State of Ohio, have invented a new and useful Improvement in a Combined Drag and Harrow, of which the following is a full, clear, and exact description, reference being had to the accompanying drawings, making part of this specification.

My invention relates to an improved combination implement, comprising a harrow drag and marker, and consists of certain features of construction and combination of parts as hereinafter described and claimed.

Figure 1, of the accompanying drawings is a view in perspective of an implement illustrating my invention. Fig. 2, is a transverse section through from $x$ to $x$, and Fig. 3, is a perspective showing the bottom portion and and one side.

A represents outwardly flaring sides having in their under sides recesses B that are oblique to the upper face in which bottom boards C are placed overlapping as shown, and in each of said boards are provided series of perforations D, adapted to receive the lower end portion of the harrow teeth E. In the upper or top side of the side pieces A, are provided recesses F, in which is placed removable cross bars G, having in each a series of perforations H, that correspond with the perforations in the board C, immediately below. The bars may be secured in sides by a wedge at the side or by a screw bolt as shown.

The front end portion of the sides A, are cut away on a line oblique to the top, on which is placed a board J that serves as a shoe to enable the body of the drag or harrow to raise upon and crush the clods, which are afterward further disintegrated by the harrow teeth. The downwardly projected rear edges of the bottom boards C, serve to pulverize the ground.

At the rear end of the side pieces A, is provided a cross bar K, having a series of apertures L, in which are placed cultivator teeth M. These teeth or shovels M, are removably secured to the bar K, and serve as markers for planting corn or other seeds or plants.

One or more of the teeth bars G and teeth, may be removed to adapt the tool to the work to be done.

To adapt the tool for removing stone from plowed fields, or removing manure from the barn, bars G, and all of the teeth and shovels will be removed.

Having thus fully described the nature and object of my invention, what I claim as new, and desire to secure by Letters Patent, is—

A combination agricultural implement, comprising the outward flaring sides mortised in their upper edges and provided with oblique or rearward inclined recesses in their lower edges, said lower edges being beveled at their forward ends, boards C secured in said oblique recesses and overlapping each other and provided with apertures, cross bars G removably secured in said mortises and provided with holes registering with those in the bottom boards, teeth located in the holes of the cross bars and projecting through the holes in the bottom board, and made removable with the cross bars, a shoe J secured to the inclined lower edges of the sides and having a greater inclination than the bottom boards a cross bar K into which the rear ends of the sides are mortised, and shovels or markers removably secured in the ends thereof, substantially as described.

In testimony whereof I have hereunto set my hand this 5th day of October, A. D. 1894.

ADOLPH K. SCHAAF.

Witnesses:
WARREN RAMSEY,
N. L. ROYER.